United States Patent [19]
Sizer, II

[11] Patent Number: 5,802,148
[45] Date of Patent: *Sep. 1, 1998

[54] SYSTEM FOR GENERATING AURAL ANNOUNCEMENTS WITHIN A PREMISES

[75] Inventor: Theodore Sizer, II, Little Silver, N.J.

[73] Assignee: Lucent Technologies, Inc., Murray Hill, N.J.

[ * ] Notice: The term of this patent shall not extend beyond the expiration date of Pat. No. 5,781,625.

[21] Appl. No.: 569,268

[22] Filed: Dec. 8, 1995

[51] Int. Cl.⁶ .............. H04M 1/21; H04M 1/57; H04M 1/66
[52] U.S. Cl. .............. 379/88; 379/89; 379/142; 379/199; 379/374; 379/442; 443
[58] Field of Search .............. 379/67, 88, 89, 379/93, 94, 96, 97, 114, 156, 157, 160, 165, 201, 207, 269, 257, 333, 353, 361, 372, 127, 142, 188, 199, 374, 442, 443; 348/6, 12, 13, 552; 370/60.1, 94.1, 110.1, 385, 524, 525; 455/3.1, 5.1

[56] References Cited

U.S. PATENT DOCUMENTS

| | | | |
|---|---|---|---|
| 4,322,581 | 3/1982 | Christain et al. | 379/165 X |
| 4,748,656 | 5/1988 | Gibbs et al. | 379/96 X |
| 5,200,994 | 4/1993 | Sasano et al. | 379/142 |
| 5,265,145 | 11/1993 | Lim | 379/199 X |
| 5,359,598 | 10/1994 | Steagall et al. | 379/353 X |

*Primary Examiner*—Harry S. Hong
*Attorney, Agent, or Firm*—Morgan & Finnegan, LLP

[57] ABSTRACT

A system for generating aural announcements of incoming calls within a premises has a premises phone connected within a premises phone line that forms first and second communication channels. The first communication channel is adapted for connection and communication to a phone network. An announcement controller is connected within the phone line and generates aural announcement signals along the second communication channel to a speaker which plays corresponding aural announcements. A switch may be operatively connected between the premises phone and announcement controller and switches the announcement controller into the second communication channel for transmitting aural announcement signals to a premises phone via the switch.

27 Claims, 4 Drawing Sheets

SYSTEM FOR GENERATING AURAL ANNOUNCEMENTS WITHIN A PREMISES

FIELD OF THE INVENTION

This application relates to a system for generating aural announcements within a premises using an announcement controller for generating aural announcement signals to a speaker over a second communication channel without interfering with baseband services to the local exchange carrier.

BACKGROUND OF THE INVENTION

Time is a precious commodity, and a telephone can be a curse or blessing depending on who calls, how long they want to talk, and the schedule of the one called, i.e., whether they are too busy to accept a call. Sometimes, one may be tempted to let the phone "ring off the hook" unless a close family member, business associate or an expected call is incoming. However, it is difficult to distinguish one call from the other to ensure that the desired person has called. Even sophisticated caller identification systems sometimes require that the called party look at a phone display for identifying the caller. It would be advantageous if an aural announcement system could state the identification of the caller through a speaker system without requiring visual identification. Such a system would be advantageous if it could use the existing wiring of the premises phone line without interfering with the existing baseband services with the local exchange carriers. It would also be advantageous if the speakers could be connected to the existing phone wire system, such as through RJ-11 jacks. It would also be advantageous if aural announcements could be generated to a premises phone without interrupting existing baseband services.

SUMMARY OF THE INVENTION

The present invention now provides a system for generating aural announcements such as caller identification within a premises using the existing wiring of the premises phone system without interfering with the existing base band service with the local exchange carrier. In accordance with the present invention, a premises phone is connected within a premises phone line that forms first and second communication channels. The first communication channel is adapted for connecting to a phone network. An announcement controller is connected within the phone line. The announcement controller includes signal generating means for generating aural announcement signals along the second communication channel extending between a switch adjacent the premises phone and the announcement controller. A speaker is connected within the phone line for receiving the announcement signals generated by the announcement controller and playing corresponding aural announcements.

In another aspect of the present invention, the switch is operatively connected between the premises phone and the announcement controller for switching the announcement controller into the second communication channel for transmitting aural announcement signals to a speaker positioned along the second communication channel or to the premises phone via the switch.

In another aspect of the present invention, the announcement controller receives incoming calls from a phone network along the first communication channel and generates aural announcement signals relating to caller identification. The speaker would play the aural announcements. In another aspect, the switch interconnects between the second communication channel for transmitting aural announcement signals to the premises phone. The announcement controller may also include a database having stored therein a plurality of caller identifications corresponding to received aural announcement signals for each caller identification. If the database does not include the calling number, an aural announcement such as "Caller Not Identified," can be generated to the speaker, or the switch operated to connect to the premises phone. The premises phone could ring and the aural announcement would be played through the premises phone.

In still another aspect of the invention, the announcement controller includes a microphone operatively connected to the signal generating means for receiving aural announcements from a premises user for generating announcement signals along the second communication channel, such as to the speaker. In still another aspect of the invention, the first communication channel comprises a twisted wire pair and a carrier signal extending along the twisted wire pair having a first frequency range. The second communication channel comprises a subcarrier signal extending along the twisted wire pair having a second frequency range.

In still another aspect of the present invention, the first communication channel can comprise a first twisted wire pair and the second communication channel can comprise a second twisted wire pair. A second twisted wire pair is sometimes found in some premises, but not always used. Thus, it may be available for use as a second communication channel.

DESCRIPTION OF THE DRAWINGS

The foregoing and other features and advantages of the present invention will be appreciated more fully from the following description, with reference to the accompanying drawings in which.

DETAILED DESCRIPTION OF THE INVENTION

Figure 1:
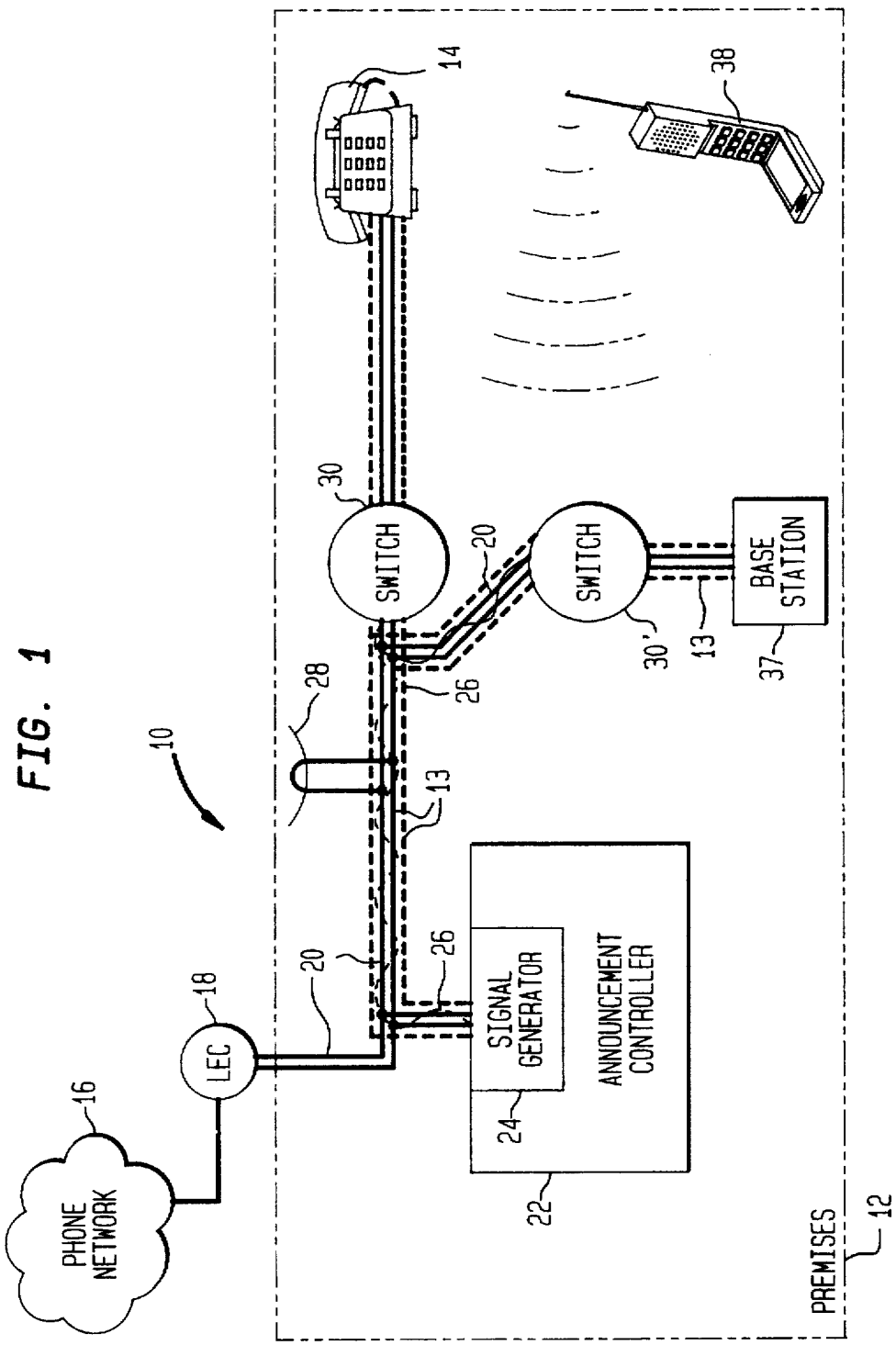
FIG. 1 is an environmental view of the system of the present invention that generates aural announcements within a premises.

Referring now to FIG. 1, there is illustrated generally at 10 a system of the present invention for generating within a premises 12 aural announcements using the existing premises phone line (shown by the dashed lines 13) without interfering with baseband services with a local exchange carrier. As illustrated, the premises phone 14 is connected to a phone network 16 by a local exchange carrier 18 and first communication channel 20.

As illustrated, an announcement controller 22, in accordance with the present invention, is connected between a switch 30 adjacent premises phone 14 and the phone network 16 along the first communication channel 20. The announcement controller 22 includes a signal generator 24 for generating aural announcement signals along a second communication channel 26 extending between the switch adjacent the premises phone 14 and to the announcement controller 22, and to a speaker 28 operatively connected to the phone line 13. The speaker 28 receives the generated analog speech signals forwarded from the signal generator 24 of the announcement controller 22 along the second communication channel 26 and converts the signals to sound signals, as is conventional.

In accordance with one aspect of the present invention, the switch 30 is operatively connected between the premises phone 14 and the announcement controller 22. The switch 30 is operatively connected between the premises phone 14 and the announcement controller 22 for switching between 1) the second communication channel 26 for transmitting aural announcement signals to the premises phone 14, via the switch and 2) the first communication channel 20 for receiving from the phone network 16 the incoming phone signals on the first communication channel 20. The announcement controller 22 could generate a signal to the premises phone 14 via the switch 30 causing the premises phone 14 to ring. Once answered, the aural announcement is generated to the premises phone.

Figure 2:
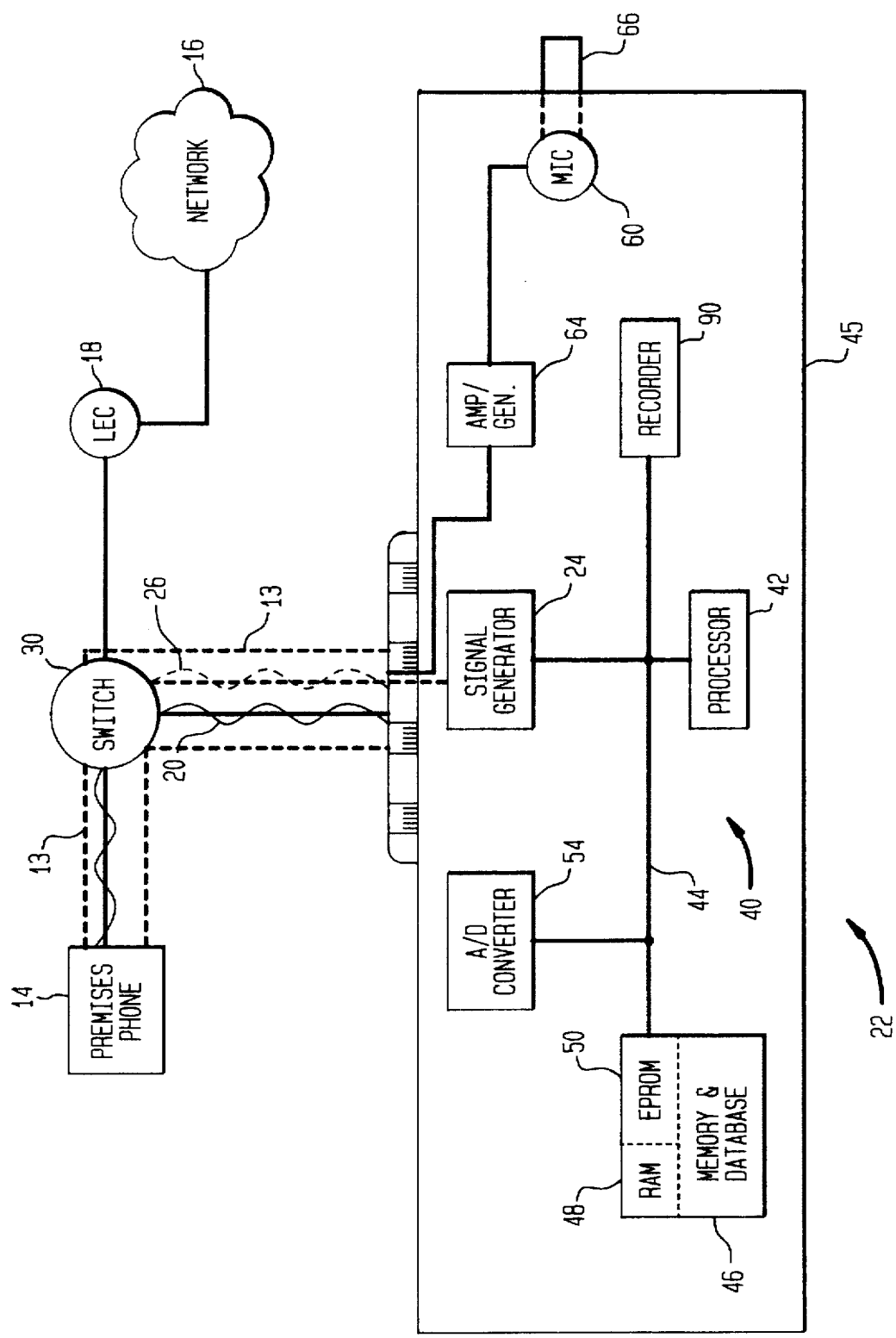
FIG. 2 is a high level block diagram of the announcement controller of the present invention.
Figure 2A:
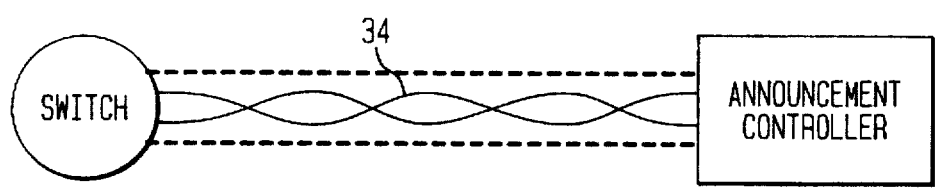
FIG. 2A is a block diagram of an embodiment of the present invention using a single twisted wire pair.
Figure 2B:
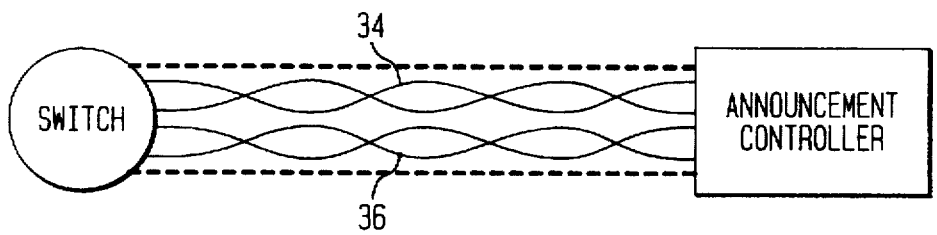
FIG. 2B is a block diagram of an embodiment of the present invention using two twisted wire pairs.

Referring now to FIG. 2A, in one embodiment of the invention, the first communication channel (20 in FIG. 1) comprises a twisted wire pair 34 and a carrier signal extending along the twisted wire pair of a first frequency range such as the conventional baseband signal of 300 Hz to 3 kHz. The second communication channel (26 in FIG. 1) can comprise a subcarrier signal extending along the twisted wire pair and having a second of a frequency range of about 300 to 400 kHz. Referring now to FIG. 2B, in still another embodiment of the invention, the first communication channel (20 in FIG. 1) can comprise a first twisted wire pair 34 and the second communication channel (26 in FIG. 1) can comprise a second twisted wire pair 36. In some premises, a second twisted wire pair 36 is part of the conventional wiring within a premises (12 in FIG. 1), but remains unused.

As shown in FIG. 1, at least two premises phones can also be used in the system of the present invention and are illustrated in the home premises environment and connected to the local exchange carrier 18 via the communication channel 20. As illustrated, a base station 37 is connected to the first communication channel 20 and works with a hand-held cordless telephone 38. One switch 30 can be used for the entire premises, or as shown in FIG. 1, can be used for one premises phone 14, and another switch 30' can be used for another phone 37 so that each premises phone can be individually controlled relative to the announcement controller 22.

Referring now in greater detail to FIG. 2, different components of the announcement controller 22 are illustrated in the block diagram. As illustrated, the announcement controller 22 has a main processing system, indicated generally at 40, which includes a microprocessor 42 connected to a digital bus 44. The announcement controller 22 typically includes a housing 45 (shown by black outline in FIG. 2) containing the processing system 40 and other components. The announcement controller 22 also includes a memory 46 for storing digital information. Part of the memory 46 can be RAM 48 for fast retrieval, as well as a hard storage device such as an EPROM 50. The memory 46 is connected to the digital bus 44.

Data such as phone numbers are stored in the memory 46. Data is read from memory 46 when instructed by the microprocessor 42. An analog-to-digital (A/D) converter 54 may be included within the announcement controller 22 for converting incoming analog signals to digital data for storage with memory 46 and further processing by the microprocessor 42. In accordance with the present invention, a microphone 60 can be mounted to the housing 45 and connected to a microphone controller and amplifier 64 for generating aural announcement signals corresponding to what is spoken through the microphone 60 and through the second communication channel 26 to the speaker (28 in FIG. 1) or through the switch 30 to the premises phone 14. An on-off button 66 may be operatively connected to the microphone 60 so that upon depression of the button 66, the microphone 60 will receive sounds and convert them by the associated circuitry 64 for generation and transmission through the second communication channel 26.

Referring now to FIGS. 1 & 2 in accordance with the present invention, the switch 30 is responsive to the generated signals of the second communication channel 26 and switches into the second communication channel and signals into the premises phone via the switch. Thus, it is evident that the present invention can be used as an intercom system. It is possible that the speaker (28 in FIG. 1) could be plugged into the conventional RJ-11 connector at a desired location within a premises and the announcement controller 22 could be positioned within the kitchen or other derived location. The button (66 in FIG. 2) is pushed, and the caller states "Come Eat." Other speakers could be wired in different parts of the premises.

Referring now to FIG. 2, incoming phone calls are forwarded to the announcement controller 22 which then identifies the caller and conducts a database look up in memory 46 to determine if there is a message corresponding to the caller identification. For example, if the premises user's mother has a certain caller I.D., the aural message can be stored in memory "Your Mom Is Calling". When the microprocessor 42 conducts the corresponding comparison, it then retrieves the recorded digital message "Your Mom Is Calling", and then forwards the corresponding data signal to the A/D converter 54 and signal generator 24, which forwards an analog signal through the second communication channel 26 to the speaker (28 in FIG. 1) or through the switch 30 to the premises phone. In accordance with another aspect of the present invention, the announcement controller could also include circuitry 90 which allows recording of messages.

Figure 3:
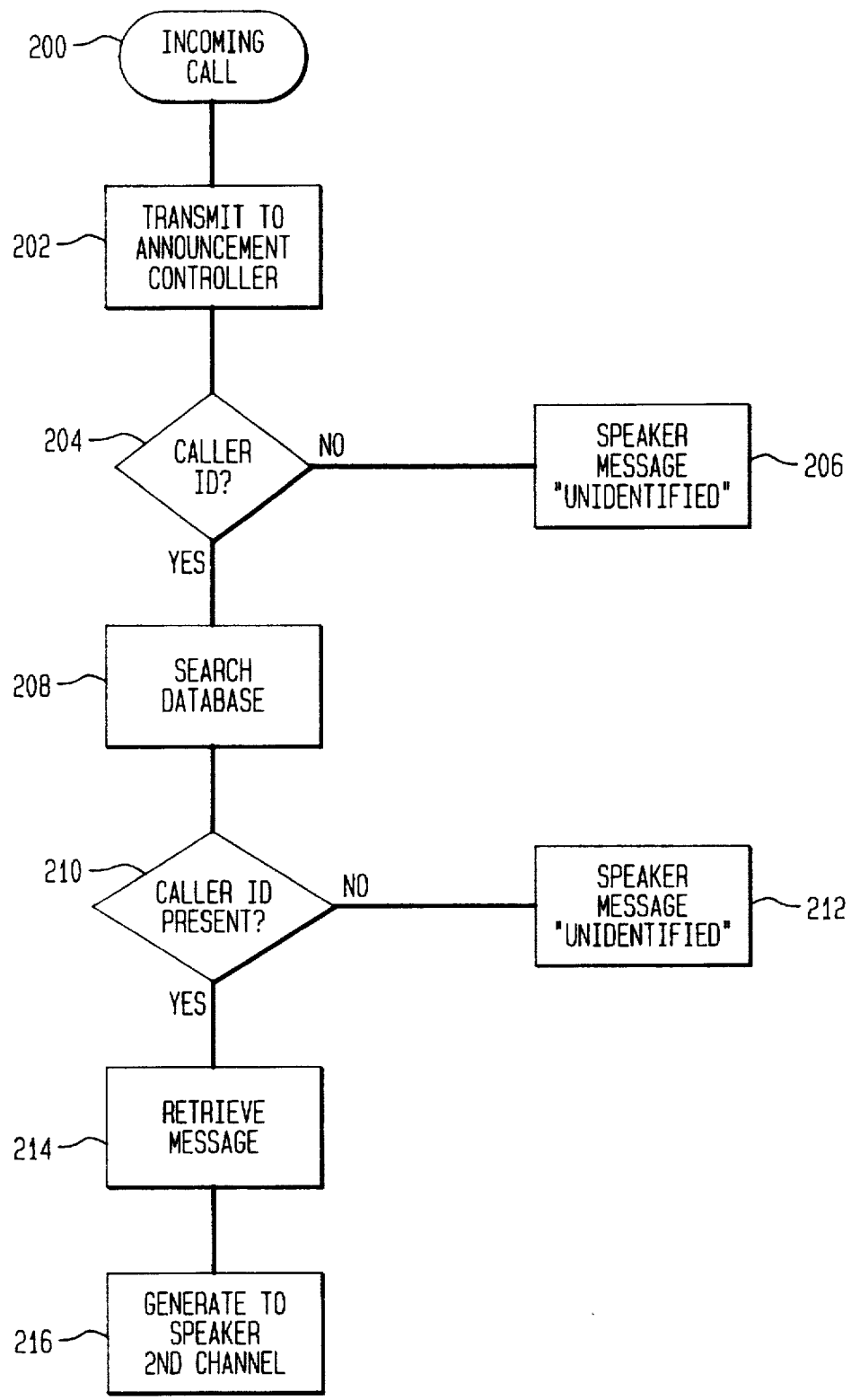
FIG. 3 is a high level flow chart depicting one sequence of possible steps where the announcement controller receives an incoming call from the phone network along the first communication channel and then generates aural announcement signals relating to caller identification along the second communication channel to a speaker.

The flow chart of FIG. 3, in conjunction with FIG. 2, illustrates the various steps of one aspect of the system for generating aural announcements within a premises. For purposes of understanding, the blocks of the flow chart are numbered with numerals starting in the two hundred series.

In block 200, an incoming call is transmitted along the first communication channel 20 to the announcement controller 22 (Block 202). The announcement controller 22 then identifies if there is a caller I.D. associated with the incoming call (Block 204). If there is no caller ID association, the microprocessor 42 retrieves a message from the memory database 46 and forwards the signal through the A/D converter 54 to the speaker stating "Caller Unidentified" (Block 206). If there is a caller I.D. association, then the microprocessor searches the memory database 46 (Block 208) to determine if the caller I.D. is present in the database (Block 210). If the caller I.D. is not present in the database, then the microprocessor 42 retrieves a message from the database and generates a signal to the A/D converter 54 corresponding to "Caller Unidentified" (Block 212). If the caller I.D. is present in the database, then the corresponding message is retrieved (Block 214) and the appropriate signals are sent to the second communication channel to the speaker where the message is delivered (Block 216). The message could be "Bob Is Calling".

It should be understood that the above description is only one preferred embodiment of the invention. Numerous other arrangements may be devised by one skilled in the art without departing from the spirit of the invention.

That which is claimed is:

1. A system for generating aural announcements of incoming calls within a premises comprising
    a premises phone for receiving analog phone signals from a telephone network,
    a switch in the premises and operatively connected to the premises phone along a first analog communication channel comprising a first twisted wire pair for switching the premises phone from communication with a phone network via the first analog communication channel on the first twisted wire pair and into a second analog communication channel extending from the switch, said second analog communication channel comprising a second twisted wire pair,
    an announcement controller operatively connected to the switch via the second analog communication channel on the second twisted wire pair and also to the phone network for generating analog aural announcement signals along the second analog communication channel on the second twisted wire pair, and
    a speaker connected within the phone line for receiving the analog aural announcement signals generated by the announcement controller along the second analog communication channel on the second twisted wire pair and playing corresponding aural announcements.

2. A system according to claim 1 including means for receiving incoming calls from a phone network along the first communication channel and generating aural announcement signals relating to caller identification.

3. A system according to claim 2 including a database having a plurality of caller identifications and corresponding aural announcements signals for each caller identification.

4. A system according to claim 1 wherein said announcement controller includes a microphone for receiving aural announcements from a premises user for generating aural announcement signals along the second communication channel corresponding to the aural announcements received over the microphone.

5. A system according to claim 1 wherein said first communication channel comprising a first twisted wire pair further comprises a carrier signal extending along said first twisted wire pair having a first frequency range, and said second communication channel further comprises a subcarrier signal extending along said first twisted wire pair having a second frequency range.

6. A system according to claim 1 wherein said announcement controller includes signal generating means for generating signals corresponding to aural announcements.

7. A system according to claim 1 wherein said announcement controller comprises an answering machine and including means for generating recorded signals along the second communication channel.

8. A system for generating aural announcements of incoming calls within a premises comprising
    a premises phone for receiving analog phone signals from a telephone network,
    a switch in the premises and operatively connected to the premises phone along a first analog communication channel for switching the premises phone from analog communication with the network via the first analog communication channel and into a second analog communication channel extending from the switch,
    an announcement controller operatively connected to the switch via the second analog communication channel and also to the phone network for generating analog aural announcement signals along the second analog communication channel, and including means for recording incoming messages and generating recorded messages along said second analog communication channel, and including means for generating analog aural announcement signals relating to caller identification, and
    a speaker connected within the phone line for receiving the analog announcement signals generated by the announcement controller and playing corresponding aural announcements of recorded messages and caller identification signals.

9. A system according to claim 8 wherein said announcement controller includes a microphone for receiving aural announcements from a premises user for generating aural announcement signals along the second communication channel corresponding to the aural announcements received over the microphone.

10. A system according to claim 8 wherein said first communication channel comprising a first twisted wire pair further comprises a carrier signal extending along said first twisted wire pair having a first frequency range, and said second communication channel further comprises a subcarrier signal extending along said first twisted wire pair having a second frequency range.

11. A system according to claim 8 wherein said first communication channel comprises a first twisted wire pair and said second communication channel comprises a second twisted wire pair.

12. A system for generating aural announcements of incoming calls within a premises comprising
    a premises phone line for receiving analog phone signals from a telephone network,
    an announcement controller connected within the phone line for receiving telephone calls along a first analog communication channel from a telephone network, and for generating analog announcement signals along a second analog communication channel,
    a switch connected within the phone line to a premises phone for switching the telephone calls along the first analog communication channel and the analog announcement signals along the second analog communication channel, and
    a speaker connected within the phone line for receiving the analog announcement signals along the second analog communication channel generated by the announcement controller and playing corresponding aural announcements.

13. A system according to claim 12 including means for receiving incoming calls from a phone network along the first communication channel and generating aural announcement signals relating to caller identification.

14. A system according to claim 13 including a database having a plurality of caller identifications and corresponding aural announcements signals for each caller identification.

15. A system according to claim 12 wherein said announcement controller includes a microphone for receiving aural announcements from a premises user for generating aural announcement signals along the second communication channel corresponding to the aural announcements received over the microphone.

16. A system according to claim 12 wherein said first communication channel comprising a first twisted wire pair further comprises a carrier signal extending along said first twisted wire pair having a first frequency range, and said second communication channel further comprises a subcarrier signal extending along said first twisted wire pair having a second frequency range.

17. A system according to claim 12 wherein said first communication channel comprises a first twisted wire pair and said second communication channel comprises a second twisted wire pair.

18. A system according to claim 12 wherein said announcement controller includes signal generating means for generating signals corresponding to aural announcements.

19. A system according to claim 12 wherein said announcement controller comprises an answering machine including means for generating recorded signals along the second communication channel.

20. A system for generating aural announcements of incoming calls within a premises comprising a premises phone for receiving analog phone signals from a telephone network, a switch in the premises and operatively connected to the premises phone along a first analog communication channel for switching the premises phone from analog communication with a telephone network via the first analog communication channel and into a second analog communication channel extending from the switch, and an announcement controller operatively connected to the switch via the second analog communication channel and also to the phone network for generating analog aural announcement signals along the second analog communication channel and to the premises phone via the switch.

21. A system according to claim 20 including means for receiving incoming calls from a phone network along the first communication channel and generating aural announcement signals relating to caller identification.

22. A system according to claim 21 including a database having a plurality of caller identifications and corresponding aural announcements signals for each caller identification.

23. A system according to claim 20 wherein said announcement controller includes a microphone for receiving aural announcements from a premises user for generating aural announcement signals along the second communication channel corresponding to the aural announcements received over the microphone.

24. A system according to claim 20 wherein said first communication channel comprising a first twisted wire pair further comprises a carrier signal extending along said first twisted wire pair having a first frequency range, and said second communication channel further comprises a subcarrier signal extending along said first twisted wire pair having a second frequency range.

25. A system according to claim 20 wherein said first communication channel comprises a first twisted wire pair and said second communication channel comprises a second twisted wire pair.

26. A system according to claim 20 wherein said announcement means includes signal generating means for generating signals corresponding to aural announcements.

27. A system according to claim 20 wherein said announcement means comprises an answering machine and including means for generating recorded signals along the second communication channel.

* * * * *